US012573687B2

(12) United States Patent
Thurmeier et al.

(10) Patent No.: US 12,573,687 B2
(45) Date of Patent: Mar. 10, 2026

(54) BATTERY CELL ARRANGEMENT, CELL SEPARATING ELEMENT, AND BATTERY CELL FOR AN ENERGY STORE OF A MOTOR VEHICLE

(71) Applicant: AUDI AG, Ingolstadt (DE)

(72) Inventors: Markus Thurmeier, Adlkofen (DE);
Christian Gert Voigt, Usingen (DE);
Florian Dirisamer, St.
Georgen/Grieskirchen (AT)

(73) Assignee: AUDI AG, Ingolstadt (DE)

( * ) Notice: Subject to any disclaimer, the term of this patent is extended or adjusted under 35 U.S.C. 154(b) by 504 days.

(21) Appl. No.: 18/164,781

(22) Filed: Feb. 6, 2023

(65) Prior Publication Data

US 2023/0268587 A1 Aug. 24, 2023

(30) Foreign Application Priority Data

Feb. 23, 2022 (DE) .......................... 102022104213.8

(51) Int. Cl.
| | |
|---|---|
| *H01M 10/6566* | (2014.01) |
| *B60L 50/60* | (2019.01) |
| *B60L 50/64* | (2019.01) |
| *B60L 58/26* | (2019.01) |
| *H01M 10/613* | (2014.01) |
| *H01M 10/625* | (2014.01) |
| *H01M 10/647* | (2014.01) |
| *H01M 50/103* | (2021.01) |
| *H01M 50/209* | (2021.01) |
| *H01M 50/291* | (2021.01) |

(52) U.S. Cl.
CPC ......... *H01M 10/6566* (2015.04); *B60L 50/64* (2019.02); *B60L 50/66* (2019.02); *B60L 58/26* (2019.02); *H01M 10/613* (2015.04); *H01M 10/625* (2015.04); *H01M 10/647* (2015.04); *H01M 50/103* (2021.01); *H01M 50/209* (2021.01); *H01M 50/291* (2021.01); *H01M 2220/20* (2013.01)

(58) Field of Classification Search
None
See application file for complete search history.

(56) References Cited

U.S. PATENT DOCUMENTS

2021/0143384 A1* 5/2021 Hoefner ................ H01M 10/61

FOREIGN PATENT DOCUMENTS

| | | |
|---|---|---|
| DE | 102010033794 A1 | 8/2010 |
| DE | 102011015152 A1 | 9/2012 |

(Continued)

OTHER PUBLICATIONS

Search Report issued on Nov. 9, 2022, in corresponding German Application No. 102022104213.8, 18 pages.

*Primary Examiner* — Wyatt P Mcconnell
(74) *Attorney, Agent, or Firm* — Maier & Maier, PLLC

(57) ABSTRACT

A battery cell arrangement for a motor vehicle. The battery cell arrangement has at least a first battery cell with a first cell housing that includes a first cell wall, and a second battery cell is arranged adjacent to the first battery cell in a first direction and that has a second cell housing with a second cell wall. The first cell wall and the second cell wall face each other. The battery cell arrangement has a gas reservoir which is filled with a gas, so that the gas is arranged between the first cell wall of the first battery cell and the second cell wall of the second battery cell.

6 Claims, 3 Drawing Sheets

(56) References Cited

FOREIGN PATENT DOCUMENTS

| | | | |
|---|---|---|---|
| DE | 102013200732 | A1 | 7/2014 |
| DE | 102019125381 | A1 | 3/2021 |
| DE | 102019130499 | A1 | 5/2021 |

* cited by examiner

BATTERY CELL ARRANGEMENT, CELL SEPARATING ELEMENT, AND BATTERY CELL FOR AN ENERGY STORE OF A MOTOR VEHICLE

FIELD

The invention relates to a battery cell arrangement for a motor vehicle, wherein the battery cell arrangement has at least a first battery cell with a first cell housing that comprises a first cell wall, and a second battery cell that is arranged adjacent to the first battery cell in a first direction and that has a second cell housing with a second cell wall, wherein the first and the second cell wall face each other. Furthermore, the invention also relates to a cell separating element for arrangement between two battery cells and a battery cell for an energy store of a motor vehicle.

BACKGROUND

Energy stores for motor vehicles are known from the prior art. These can be designed as high-voltage batteries, for example. Such an energy store typically has several battery cells which, for example, can be arranged next to one another in a stacking direction and combined to a cell pack or cell stack. Furthermore, cell separating elements can be arranged between two adjacently arranged battery cells in order to separate the battery cells from one another as well as possible electrically and also thermally. In the event of a thermal runaway of a battery cell, such a battery cell heats up very strongly. In addition, hot gas also escapes from such a battery cell with thermal runaway. Without further countermeasures, this means that adjacent battery cells also heat up very quickly and in the course of this also thermally run away, which can ultimately lead to thermal propagation and thermal runaway of all battery cells comprised in the battery, and ultimately to a battery fire.

It would therefore be desirable to be able to prevent or at least delay such thermal propagation. DE 10 2013 200 732 A1 describes a device for providing safety measures when gas is released from a vehicle battery, in particular from a damaged lithium-ion accumulator for hybrid or electric vehicles, wherein the vehicle battery is arranged in a volume space having an opening, with at least one cover element that can be filled with gas and has openings, which is designed to expand into a volume space by being filled with a gas, such that when the cover element expands, the openings of the cover element enlarge and the content of the cover element is released into the volume space through the enlarged openings of the cover element, and with at least one apparatus for filling the cover element, which is designed to fill the cover element at least partially with carbon dioxide gas upon receipt of a trigger signal, so that carbon dioxide gas is released into the volume space at least partially as the content of the cover element. The expansion of the cover element can be used to displace the gas escaping from the battery cells. At the same time, the escaping carbon dioxide gas is used to extinguish any fire that may have occurred and to cool the energy store. However, this design requires numerous additional components and requires additional installation space, especially for the apparatus for filling the cover element and for storing the carbon dioxide gas as such.

SUMMARY

The object of the present invention is therefore to provide a battery cell arrangement, a cell separating element and a battery cell that make it possible to increase safety in connection with an energy store for a motor vehicle, in particular with regard to a possible thermal runaway of a battery cell of such an energy store, in the most installation space-saving manner possible. This object is achieved by a battery cell arrangement, a cell separating element and a battery cell.

A battery cell arrangement according to the invention for a motor vehicle has at least one first battery cell with a first cell housing that comprises a first cell wall and a second battery cell that is arranged adjacent to the first battery cell in a first direction and has a second cell housing with a second cell wall. The first and the second cell wall face each other. Furthermore, the battery cell arrangement has a gas reservoir that is filled with a gas, so that the gas is arranged between the first cell wall of the first battery cell and the second cell wall of the second battery cell.

The invention is based on the finding that a gas can provide an extinguishing effect and a cooling effect in the event of a thermal runaway of a battery cell or in the event of a cell fire or battery fire, but that a gas can also provide a very good thermally insulating effect at the same time, which makes it possible to use the gas accommodated in the gas reservoir at the same time as a cell separating element between adjacently arranged battery cells or the first and the second cell wall. As a result, such a gas can also be accommodated in a particularly installation space-saving manner, in particular no additional installation space is required for this. Such a gas reservoir can thus be integrated in a cell stack with several battery cells arranged adjacently in the stacking direction in a particularly advantageous and efficient manner, wherein the stacking direction corresponds to the first direction defined above. Thus, the gas reservoir can also provide a dual function at the same time.

The gas is preferably an oxygen-free gas. As a result, the gas can be used particularly efficiently to extinguish a battery fire or to cool the battery cells in the event of a thermal runaway of such a battery cell. Carbon dioxide is particularly suitable as gas, or another gas, in particular an inert gas, for example a noble gas or nitrogen, or the like. A gas should also be able to be understood in particular as a gas mixture.

The first and the second battery cell can be lithium-ion cells, for example. In addition, the battery cells can be designed, for example, as prismatic battery cells or pouch cells. The gas reservoir provides, for example, a chamber or an interior space that is closed off in a gas-tight manner, in which the gas is accommodated. Thus, at least in the normal operating state of the battery cell arrangement, in which there is no cell defect or no thermal runaway of one of the battery cells comprised by the battery cell arrangement, the gas cannot escape from this interior space provided by the gas reservoir.

In a further very advantageous configuration of the invention, the gas reservoir has at least one releasable gas outlet opening, and the gas reservoir is furthermore designed such that a thermal runaway of the first and/or second battery cell causes a release of the releasable gas outlet opening and a discharge of the gas through the released gas outlet opening in order to cool the first and/or second battery cell. This has the great advantage that the gas contained in the gas reservoir can not only be used to thermally insulate the battery cells from one another, but also for active cooling and/or fire suffocation in an emergency. The cooling effect comes about in particular because the gas expands as it exits through the gas outlet opening and cools as a result. Accordingly, it is advantageous if the gas, when it is accommodated in the gas reservoir, has an overpressure compared to the ambient pressure. This overpressure does not necessarily have to be constant during operation of the battery cell arrangement or over the course of its service life. For example, the battery cells can be created such that they swell up and down depending on their charge, which is also referred to as charge-related swelling, and also swell up over the course of their service life, which is also referred to as aging-related swelling. The battery cells expand in the stacking direction, i.e. the first direction defined here, over the course of their service life. Due to this expansion, the gas pressure in the gas reservoir can also increase accordingly over time, since this reduces the interior space in which the gas is accommodated. As a result, the cooling effect is all the more effective when gas escapes. In addition, it can be provided that the first and the second battery cell, and possibly further battery cells, are clamped together. This clamping also leads to a certain pressure being exerted on the gas reservoir, which in turn influences the gas pressure within the gas reservoir. The gas supply and discharge can be embodied as one. In other words, the opening that is used to fill the gas reservoir with gas can be used as the releasable gas outlet opening at the same time. In order to make this possible, it is therefore advantageous if the gas reservoir walls, which delimit the interior space of the gas reservoir in which the gas is accommodated, are designed to be at least partially deformable and/or elastically deformable or at least flexible with respect to the first direction, in particular as a function of an application of force or application of pressure in and against the first direction. An increase in pressure of the gas within the gas reservoir can thus advantageously be used to bring about an even more efficient cooling effect if the gas escapes through the releasable gas outlet opening. The functioning of the gas reservoir can then be compared to that of a $CO_2$ fire extinguisher. Thus, in the event of a thermal runaway of a battery cell, a particularly efficient extinguishing and cooling effect can advantageously be provided by the gas reservoir and the escaping gas. As a result, an emerging battery fire can be smothered, an already existing battery fire can be extinguished and thermal propagation can also be stopped or at least delayed.

In a further advantageous configuration of the invention, the at least one releasable gas outlet opening is designed such that it opens under a specific condition, which is that a temperature and/or a pressure of the gas exceeds a predeterminable threshold value. If thermal runaway occurs in a battery cell, such as the first and/or second battery cell, this also leads to a corresponding rise in temperature of the gas contained in the gas reservoir due to the spatial proximity to the gas reservoir. This also increases the pressure of the gas inside the gas reservoir. This has the advantage that both the temperature of the gas and the pressure of the gas can be used as triggering mechanisms for releasing the releasable gas outlet opening. For example, the at least one gas outlet opening can be designed as a pressure relief valve which opens when the gas pressure exceeds the predeterminable threshold value. This threshold value is then dimensioned accordingly such that the valve is closed under normal operating states, in which the battery cell arrangement does not comprise a battery cell with thermal runaway. But a releasable gas outlet opening, which opens depending on the temperature, would also be conceivable. In any case, it is preferred that the releasable gas outlet opening opens the gas outlet under the specific condition, such as exceeding the predeterminable threshold value, without active activation.

The releasable gas outlet opening can, for example, also simply be designed as a predetermined breaking point in the gas reservoir.

In addition, it is also possible that the gas reservoir not only has a single gas outlet opening, but also several ones.

In a further advantageous configuration of the invention, a state parameter is assigned to the gas accommodated in the gas reservoir, in particular a gas pressure and/or a gas temperature, wherein the battery cell arrangement is configured such that the state parameter can be changed and in particular a change in the state parameter can be controlled, for example as a function of controlled charging or discharging of at least one of the first and second battery cell. When charging, i.e. when the state of charge of the relevant battery cell increases, the battery cell expands and when discharging it reduces swelling again. As a result, when charging battery cells arranged adjacent to the gas reservoir or battery cells enclosing the gas reservoir, the gas in the gas reservoir is also increasingly compressed, which increases its gas pressure and gas temperature, while when the battery cells are discharged and their swelling is reduced, the gas pressure and thus the gas temperature also decrease again. Therefore, a targeted, i.e. controlled, stronger or less strong charging or decharging of the first and/or second battery cell can be used and also to influence or to control and adjust the state parameter of the gas in a targeted manner or at least to control its change, e.g. increase or decrease. In addition, a change, e.g. increase, in the gas temperature also causes a change, e.g. increase, in the gas pressure, so that an adjustment or influencing of the gas temperature, in particular controlled influencing of the gas temperature, can also be used to change the state parameter, in particular the gas pressure, in a targeted manner. The gas temperature can be indirectly influenced by the temperature of the first and second battery cell, and also, for example, by a cooling apparatus or temperature control apparatus to which the first and/or second battery cell and/or the gas reservoir can be connected. The gas or its state can therefore change actively over time (e.g. pressure, etc.), and this can also be controlled, for which purpose a control apparatus can be provided as part of the battery cell arrangement, for example. As a result, the opening of the releasable gas outlet opening mentioned above can also be controlled passively via the state parameter of the gas. In other words, for example, the gas pressure can be controlled such that it exceeds the pressure threshold value of the releasable gas outlet opening, so that it opens.

In a further advantageous configuration of the invention, the gas reservoir has a deflection element which is arranged in the region of the at least one releasable gas outlet opening and which is adapted to direct the gas flowing out of the gas outlet opening in its flow direction, in particular in the direction of the first or second battery cell. For example, the gas reservoir can be configured such that the gas flows out of the gas reservoir perpendicularly to the first direction if the releasable outlet opening is released. By deflecting this gas flow by means of a deflection element, it is then advantageously possible to direct the exiting gas flow back in the direction of the first battery cell and/or the second battery cell in a targeted manner. For example, such a deflection element can be configured in the form of a bent deflection plate or the like. This further increases the cooling effect.

Furthermore, the dimensions of the gas reservoir perpendicular to the first direction can also correspond to the corresponding dimensions of the first and second battery cell. In this way, the installation space available between battery cells can be used to the maximum for accommodating a gas, and the total volume of gas that can be provided can be maximized as a result. In this way, adjacent battery cells can also be thermally insulated very well from one another.

In a further very advantageous configuration of the invention, the gas reservoir has a first reservoir wall and a second reservoir wall, which delimit an interior space of the gas reservoir on both sides with respect to the first direction, wherein the gas is accommodated in the interior space, wherein in particular the first and/or second reservoir wall is designed with a wall structure such that a thickness of the interior space varies at least in a second direction perpendicular to the first direction.

In a further very advantageous configuration of the invention, the gas reservoir has a first reservoir wall and a second reservoir wall, which delimit an interior space of the gas reservoir on both sides with respect to the first direction, wherein the gas is accommodated in the interior space, wherein in particular the first and/or second reservoir wall is designed with a wall structure such that a thickness of the interior space varies at least in a second direction perpendicular to the first direction. Such a wall structure can advantageously be used to increase the stability of the relevant reservoir wall without having to make the wall itself thicker. For example, the first and/or second reservoir wall can be designed with indentations in or counter to the first direction, which lead to a corresponding narrowing or constriction of the relevant region in the interior space of the gas reservoir. Due to the increased structural rigidity provided by the first and/or second reservoir wall, it can be achieved, for example, that the gas reservoir does not immediately collapse by the contact pressure of the adjacently arranged battery cells.

In addition, such a wall structure is also suitable for setting and adapting the pressure conditions in the interior of the gas reservoir in a targeted manner. Furthermore, the wall structure can be designed such that the thickness of the interior space varies in only one direction perpendicular to the first direction, that is, perpendicular to the first direction, or in addition to a third direction perpendicular to the first direction and perpendicular to the second direction. A one-dimensional groove-like structure as a wall structure is particularly advantageous because it divides the interior space into individual gas channels. A releasable outlet opening or predetermined breaking point can then be provided for each channel, for example, or the channels can also be connected to one another fluidically, in which case a common releasable outlet opening is sufficient for all channels.

In a further advantageous configuration of the invention, the gas reservoir is designed as a component separate from the first battery cell and the second battery cell, in particular wherein the first reservoir wall and the second reservoir wall are joined to one another in a peripheral edge region, and wherein a respective spacer is arranged as part of the gas reservoir along at least two edges of the edge region opposite with regard to a direction perpendicular to the first direction, which spacer defines a specific minimum thickness of the gas reservoir in the first direction at the edges.

Generally, the gas reservoir, as will be explained in more detail later, can in principle also be embodied to be integrated into a battery cell or be delimited by the cell walls themselves. However, it is particularly advantageous if the gas reservoir is designed as a component that is separate from the first and second battery cell. This means that the reservoir walls are neither part of the first battery cell nor part of the second battery cell. This simplifies the production of the battery cells and saves costs. Generally, the reservoir walls can be made of a metal, preferably steel, or a ceramic or a plastic. Fiber-reinforced plastics can also be used. The gas reservoir walls can be joined circumferentially in the edge region by means any joining technique, for example welded together. The maximum thickness of the gas reservoir in the first direction is a few millimeters, for example 2 to 4 millimeters. A certain pressure relief for the gas reservoir, especially in the central region of the gas reservoir, can additionally be provided by the spacers that are also arranged in the edge region. These spacers can be designed, for example, in a type of rails that are arranged on two opposite edges of the gas reservoir, for example left and right or above and below, or also as a frame running completely around the edge region. The spacers are designed to be non-compressible or incompressible and thus always ensure a certain minimum thickness, at least in the region in which they are arranged. Since the spacers are arranged at least on opposite edges of the gas reservoir, it can be ensured, at least when the battery cells are not yet swollen and have essentially flat cell walls, that the region of the gas reservoir between the two spacers is not affected too much by the pressure exerted on the gas reservoir by the cell walls. Thus, the battery cells as a cell stack can initially be braced against one another with a specific pretensioning force without the interior space of the gas reservoir, in which the gas is located, being compressed too much as a result. In case of a design as a gas reservoir separate from the cells, this can also be provided in the form of a pouch, which can also be referred to as a bag or gas bag.

The spacers can also be designed in the form of elongate clamps that encompass or clamp the joined edge region of the reservoir walls. For example, such a spacer can be designed to be U-shaped in cross section, in particular with a groove in which the edge region of the reservoir walls joined together is accommodated. In the clamped state of the battery cell arrangement, a contact pressure is simultaneously exerted on the joined edges of the reservoir walls via spacers designed in this way. This additionally seals the reservoir walls.

In this case too, when the gas reservoir is designed as a separate component, it is very advantageous if the gas reservoir walls are designed with a wall structure, for example, as already described above. This results in another great advantage: If the first and second cell wall, which border the respective gas reservoir walls, are designed to be flat, a structured design of the reservoir walls means that the reservoir walls do not lie against the cell walls over their entire surface, but cavities result here again as well. In the event of a thermal runaway of one of the battery cells, this makes it possible to introduce the gas contained in the gas reservoir into such a cavity in a targeted manner. In other words, the gas reservoir can be designed and arranged between the first and second battery cell such that the intermediate space between the first and second battery cell is only partially filled with the gas reservoir and partially has free regions into which the gas contained in the gas reservoir can be introduced under the above predetermined condition. The gas can thus be introduced into the intermediate space between the battery cells in a targeted manner to cool the battery cells. A particularly efficient cooling of the battery cells can be provided there. Nonetheless, it would also be conceivable to provide the releasable outlet opening in an edge region of the gas reservoir. It is then again advantageous if a deflection element is arranged there in order to direct the outflowing gas in the direction of the first battery cell and/or second battery cell in a targeted manner.

In a further advantageous configuration of the invention, the first reservoir wall is provided by the first cell wall of the first cell housing and the second reservoir wall is provided by the second cell wall of the second cell housing, in particular wherein the first and second cell wall are sealed off from one another in a peripheral region and wherein a spacer is arranged in the peripheral region at least in sections and that locally defines a minimum distance between the first and second cell wall. The intermediate space between two battery cells can thus advantageously be used completely for filling with a gas. The gas reservoir walls are then advantageously provided by the cell walls of the adjoining battery cells themselves. For this purpose, these can be sealed relative to one another in a peripheral manner in an edge region. Such a seal can then correspondingly also take on the function of a spacer at the same time. In order to provide a suitable releasable gas outlet opening, this can be integrated into any desired region of the seal, for example. This can in turn be configured as a pressure relief valve or as a predetermined breaking point or the like. Since in this case the intermediate space between two battery cells arranged adjacent to one another is used completely for filling with a gas, it is advantageous to provide a deflection element in an edge region, via which the exiting gas flow can be deflected to one of the adjoining battery cells or to both of the adjoining battery cells.

In a further advantageous configuration of the invention, the first cell wall of the cell housing represents a first inner wall of the cell housing, which adjoins an interior of the first battery cell enclosed by the cell housing, wherein the cell housing has a first outer wall which adjoins an environment of the first battery cell, wherein the first outer wall is arranged next to the first inner wall in the first direction, and wherein the first reservoir wall is provided by the first inner wall of the first cell housing and the second reservoir wall is provided by the first outer wall of the second cell housing.

Thus, in this example, the gas reservoir is integrated into the first battery cell. It can be designed with a type of double wall on one side or on both sides with respect to the first direction. In this case, this double wall thus comprises an inner wall and an outer wall which are at a distance from one another and as a result provide an interior space in which the gas is accommodated. The at least one releasable gas outlet opening can then be provided, for example, in an edge region between the inner wall and the outer wall or also in a region of the outer wall itself, at least if the gas has room to escape here. A respective battery cell can, for example, also be designed with such a double wall on only one side. If several such battery cells are then arranged next to one another in the stacking direction, i.e. the first direction, such a gas reservoir is located between each two adjacently arranged cell interiors of two battery cells. The cell interior is defined in particular by the fact that the cell chemistry is accommodated in the interior the battery cell, for example a cell coil with an anode, a cathode and a separator, and an electrolyte.

Furthermore, the cell housings are embodied to be electrically insulating from the outside. This can be provided most simply by the cell housing having an electrically insulating casing, which can be provided by a thin plastic film. An insulation layer can be provided on each battery cell as part of the outer cell wall, for example made of Capton with a layer thickness of 0.08 millimeters. If the battery cell is designed with a double wall, then this electrical insulation is designed as part of the outer wall and is directly adjacent to an environment of the battery cell. In the two other cases described above, on the other hand, the electrical insulation is to be regarded as part of the first cell wall, which is directly adjacent to an environment of the battery cell, in particular directly to the gas accommodated in the gas reservoir or to a reservoir wall.

In the case of the gas reservoir integrated into a battery cell, it is also advantageous if, for example, the outer wall is also designed with a surface structure or a wall structure. On the one hand, the rigidity of the gas reservoir can also be increased here. On the other hand, it is also conceivable here, in an emergency, to introduce the gas into the cavities between the battery cells provided by this surface structure in a targeted manner, which enables very efficient cooling. It is also conceivable that the second battery cell is also double-walled, so that the second cell wall also represents an inner wall, which is adjoined by an outer wall in the opposite direction to the first direction. The outer wall of the second battery cell then faces the outer wall of the first battery cell. The wall structures of the respective outer walls can then be designed to be complementary to one another, so that the two outer walls of the battery cells can be plugged into one another, like Lego bricks.

In addition to the first and second battery cells, the battery cell arrangement can also have several further battery cells which are arranged next to one another with respect to the first direction. A corresponding gas or gas reservoir can then be arranged between each two battery cells arranged next to one another in the first direction, or each of these battery cells can be designed with a correspondingly integrated gas reservoir. It can also be provided that the opening of all releasable outlet openings of the respective gas reservoirs is coupled to one another by a coupling mechanism. In other words, if one of the several releasable outlet openings is released, this also triggers an opening of all the other releasable gas outlet openings, at least within the same battery module. For example, adjacent ones or all other releasable outlet openings can be opened by overflowing with the gas already exiting one of these outlet openings and, for example, their closures can be torn away or the like. The opening of the respective outlet openings can take place according to a kind of chain reaction.

Furthermore, the invention also relates to a cell separating element for arrangement between two battery cells of a cell stack. The cell separating element is designed as a gas reservoir that has a first reservoir wall and a second reservoir wall that delimit an interior space of the gas reservoir on both sides with respect to a first direction, wherein a gas is accommodated in the interior space.

The advantages described for the battery cell arrangement according to the invention and its embodiments thus apply similarly to the cell separating element according to the invention. It is therefore embodied in particular as a gas reservoir that is separate from the battery cells, as has already been described in connection with exemplary embodiments of the battery cell arrangement according to the invention. Correspondingly, the design options for the separate gas reservoir that have already been described in connection with the embodiments of the battery cell arrangement according to the invention should also apply analogously to the cell separating element according to the invention.

It is particularly advantageous, for example, if the gas reservoir has at least one releasable gas outlet opening through which the gas can be discharged from the gas reservoir under at least one specific condition. Such an outlet opening can be located, for example, in one of the reservoir walls or in both reservoir walls or also in an edge region in which the reservoir walls are joined together. A spacer can also be provided here on two opposite edges.

Furthermore, the invention also relates to a battery cell for an energy store of a motor vehicle, wherein the battery cell has a cell housing with an inner wall which adjoins an interior of the battery cell enclosed by the cell housing. In this case, the cell housing has an outer wall that adjoins an environment of the battery cell, wherein the first outer wall is arranged next to the first inner wall in a first direction, and wherein the inner wall encloses an interior space that is different from the interior of the battery cell and is filled with a gas. In other words, the battery cell is designed with an integrated gas reservoir. Here too, the advantages described in connection with the exemplary embodiments of the battery cell arrangement according to the invention apply in the same way to the battery cell according to the invention. Further developments of the battery cell according to the invention, which have already been described in connection with the battery cell arrangement according to the invention and its embodiments, should also be regarded as belonging to the invention.

The invention also includes further developments of the cell separating element according to the invention and the battery cell according to the invention, which have features as already described in connection with the further developments of the battery cell arrangement according to the invention. For this reason, the corresponding further developments of the cell separating element according to the invention and the battery cell according to the invention are not described again here.

An energy store for a motor vehicle, which comprises a battery cell arrangement according to the invention or one of its configurations, and a motor vehicle with a battery cell arrangement according to the invention or one of its configurations should also be regarded as belonging to the invention.

The energy store can be designed as a high-voltage battery. The motor vehicle according to the invention is preferably configured as an automobile, in particular as a passenger car or truck, or as a passenger bus or motorcycle.

The invention also comprises the combinations of the features of the described embodiments.

The invention also comprises implementations that each have a combination of the features of several of the described embodiments, unless the embodiments were described as mutually exclusive.

BRIEF DESCRIPTION OF THE FIGURES

Exemplary embodiments of the invention are described hereinafter. In the figures.

DETAILED DESCRIPTION

Figures 1, 2:
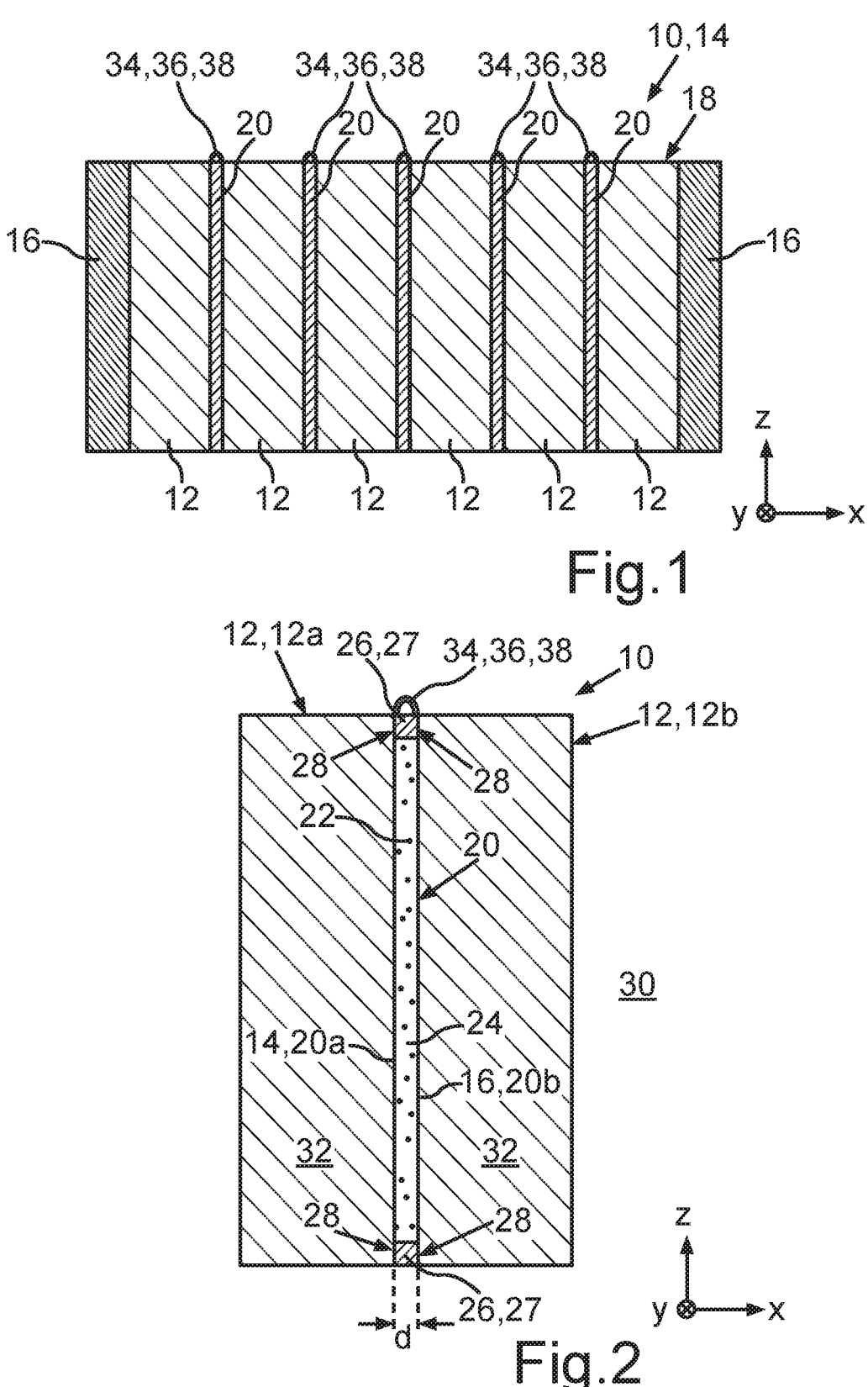
FIG. 1 shows a schematic representation of a battery cell arrangement according to an exemplary embodiment of the invention.
FIG. 2 shows a schematic representation of a detailed view of a part of the battery cell arrangement of FIG. 1 according to an exemplary embodiment of the invention.

The exemplary embodiments explained hereinafter are preferred embodiments of the invention. In the exemplary embodiments, the described components of the embodiments each represent individual features of the invention to be considered independently of one another, which each also refine the invention independently of one another. Therefore, the disclosure is also intended to comprise combinations of the features of the embodiments other than those represented. Furthermore, the described embodiments can also be supplemented by further features of the invention as already described.

In the figures, same reference numerals respectively designate elements that have the same function.

FIG. 1 shows a schematic representation of a battery cell arrangement 10 according to an exemplary embodiment of the invention. The battery cell arrangement comprises several battery cells 12 which are arranged next to one another in a stacking direction, wherein this stacking direction is represented here by the x-direction represented here and is also referred to as the first direction in the context of the present invention. In the present case, a battery module 14 is provided by this battery cell arrangement 10. End plates 16 can delimit the cell stack 18 on both sides in its stacking direction. The cell stack 18 can also be braced by means of these end plates 16.

Furthermore, the battery cell arrangement 10 in this example comprises several gas reservoirs 20 in which a gas 22 (cf. FIG. 2) is accommodated. For this, FIG. 2 again shows an enlarged representation of a section of the battery cell arrangement 10 represented in FIG. 1. The gas 22 accommodated in the gas reservoir 20 preferably is $CO_2$, but can also represent any other gas, preferably oxygen-free. In principle, such a gas reservoir 20 can be integrated into the cell stack 18 in various ways. In the present example, cell walls of the battery cells 12 also function as reservoir walls. As represented in FIG. 2, a first battery cell 12a has a first cell wall 14 and the second battery cell 12b arranged adjacent in the x-direction has a cell wall 16, wherein the first cell wall 14 of the first battery cell 12a faces the second cell wall 16 of the second battery cell 12b. The first cell wall 14a thus functions as a first reservoir wall 20a and the second cell wall 16 of the second battery cell 12b as a second reservoir wall 20b of the reservoir 20, wherein the gas 22 is accommodated in the interior space 24 located in the x-direction between the two reservoir walls 20a, 20b. The two cell walls 14, 16, which provide the reservoir walls 20a, 20b, are circumferentially sealed relative to one another by a seal 26 in the edge region 28 of the respective reservoir walls 20a, 20b. At the same time, this seal 26 can also provide a spacer 27, which ensures that the two battery cells 12a, 12b always have a certain minimum distance d from one another, at least in this peripheral edge region 28. This advantageously ensures that the interior space 24 does not collapse as a result of the contact pressure generated by the end plates 16 or another bracing mechanism.

Furthermore, the cell walls 14, 16 as well as the other cell wall sides that delimit the respective battery cells 12 from an environment 30 can be formed with electrical insulation, for example a plastic film. In the present case, such a plastic film can be regarded as part of these cell walls 14, 16 and can represent an outer layer of these cell walls 14, 16. These cell walls 14, 16 thus separate an interior 32 of a respective battery cell 12, in which the cell chemistry of the battery cell 12 in question is also arranged, from the environment 30.

Furthermore, the gas reservoir 20 has at least one releasable outlet opening 34. In the present example, it is designed with a closure 36 which, in this example, also functions as a gas guide element 38 at the same time. The releasable outlet opening 34 can be provided, for example, in the form of a predetermined breaking point or an overpressure valve. In the present example, this outlet opening 34 is arranged in the edge region 28. Under certain conditions, this opening 34 can be released by opening the closure element 36, as a result of which the gas 22 can flow out under expansion, as a result of which it cools down at the same time. As a result, the gas reservoir 20 can provide good thermal insulation between the battery cells 12 and at the same time a quenching and cooling apparatus that can be used advantageously in the event of a thermal runaway of a battery cell 12 to stop or delay thermal propagation and to smother an emerging battery fire or to at least partially extinguish an already ignited fire or at least to contribute to extinguishing it.

The releasable opening 34 can thus be designed such that it opens when, for example, the first battery cell 12a or the second battery cell 12b thermally runs away. A thermal runaway of such a battery cell 12a, 12b manifests itself in strong heating of the relevant battery cell 12a, 12b, as a result of which the gas 22 in the adjoining interior space 24 is also correspondingly heated and thus expands. At the same time, this can also serve as an opening mechanism for releasing the releasable opening 34. This can, for example, be designed accordingly as a pressure relief valve or as a release mechanism which releases the opening 34 as a function of a threshold temperature being exceeded. The releasable opening 34 can also be embodied as a predetermined breaking point that tears open, in particular in a controlled manner, when the gas pressure in the interior space 24 exceeds a specific threshold value. Through the controlled tearing open, it can then advantageously also be brought about that, for example, the closure 36 is bent open such that, in the open state, a gas guide function is also provided by it at the same time. This deflects the gas 22 flowing out in the z-direction in the present example, in particular in the direction of one of the adjacent battery cells 12a, 12b. As a result, the cooling effect can be directed onto the battery cells 12 in a controlled manner.

In addition, it is also possible and above all advantageous if an opening of the respective releasable openings 34 of the battery cell arrangement 10 is coupled. For example, the outflow of gas 22 from an already open opening 34 can cause the adjacent releasable openings 34 to open. The gas 22 then correspondingly flowing out can in turn bring about an opening of the adjacent releasable opening 34 of the gas reservoir that is closest in the x-direction or of the gas reservoir 20 that is closest in the opposite direction to the x-direction, and so on. In the event of a thermal runaway of a battery cell 12, the relevant battery cell 12 as well as all other battery cells 12 can be cooled particularly efficiently by the outflowing gas 22 and a fire can thereby be prevented or at least delayed or even extinguished.

The outflowing gas 22 acts like that of a $CO_2$ fire extinguisher. Accordingly, it is advantageous if the gas 22 has a certain excess pressure compared to the pressure in the region of 30 for as long as the opening 34 is closed, since the cooling of the gas 22 upon exit from the opening 34 depends on the pressure difference. In this case, the fact that the battery cells 12 swell in the x-direction over the course of their service life can also advantageously be used. This leads to a compression of the interior space 24, and thus to an increasing gas pressure of the gas 22 in this interior space 24. This again increases the efficiency of the cooling of the gas 22 in the event of a gas leak.

However, the gas reservoir walls 20a, 20b do not necessarily have to be provided by cell walls 14, 16 themselves, but the gas reservoir 20 can also be provided as an independent component, in particular separately from the battery cells 12.

Figures 3, 4:
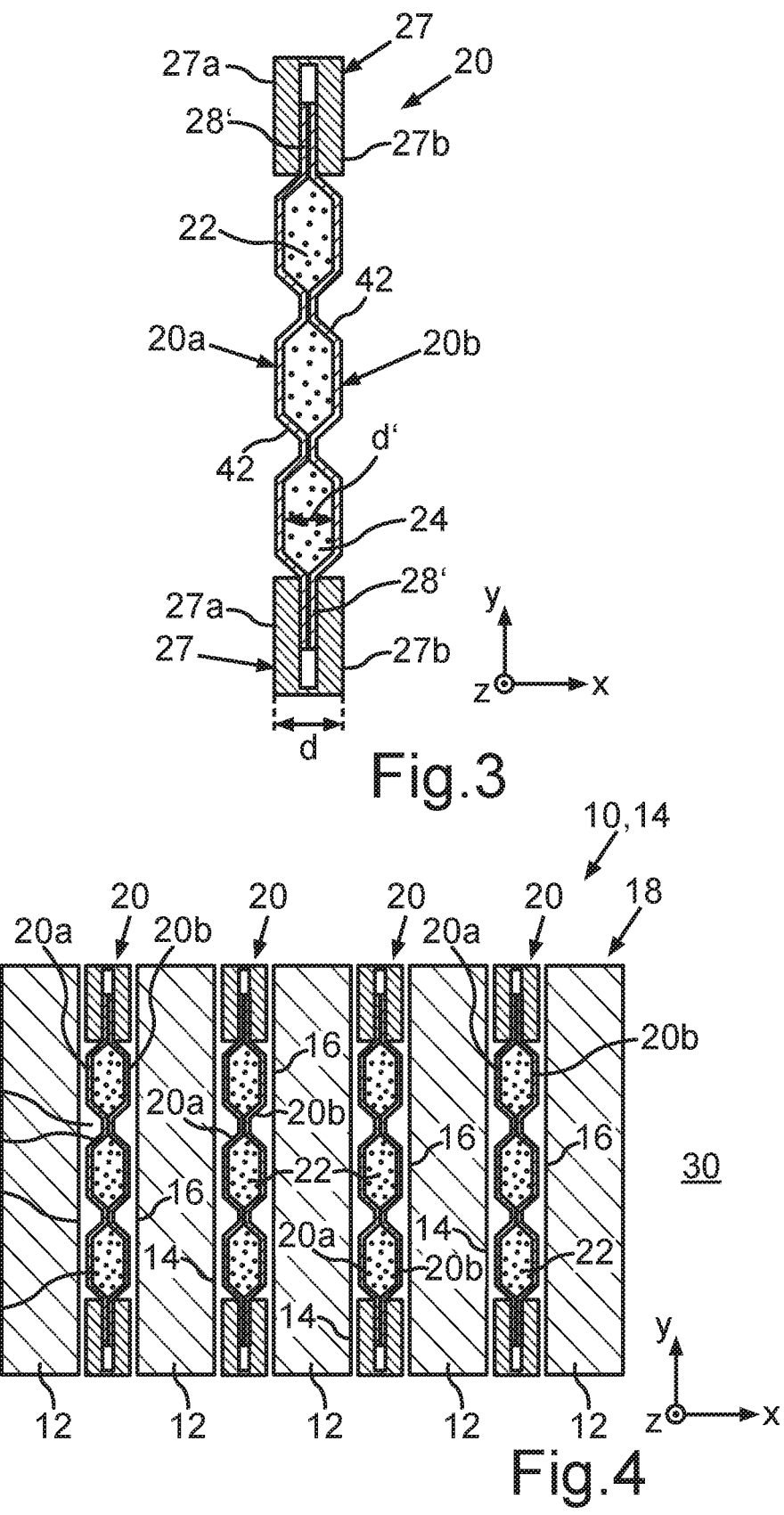
FIG. 3 shows a schematic representation of a cell separating element designed as a gas reservoir according to an exemplary embodiment of the invention.
FIG. 4 shows a schematic representation of a battery cell arrangement with cell separating elements according to FIG. 3 according to an exemplary embodiment of the invention.

Such a separate gas reservoir 20 is represented as an example in a plan view of FIG. 3, i.e. in a plan view of the z-direction which can, for example, correspond to a vehicle height direction if such a gas reservoir 20 and in particular a battery cell arrangement 10 are applied in a motor vehicle. However, other installation positions are also conceivable. In this example, the gas reservoir 20 is now embodied as a separate component and again has a first reservoir wall 20a and a second reservoir wall 20b, between which a gas 22 is accommodated in the x-direction. The two gas reservoir walls 20a, 20b are joined together circumferentially in an edge region 28', for example welded. The reservoir walls 20a, 20b thus in turn enclose an interior space 24 in which the gas 22 is located. Furthermore, the reservoir walls 20a, 20b are formed with a wall structure 40 in this example. This results in a thickness d' of the interior space 24 varying at least in a direction perpendicular to the x-direction, in the present case in the y-direction represented here. The rigidity of the gas reservoir 20 can be increased by this wall structure 42. FIG. 4 once again shows a schematic representation of a battery cell arrangement 10 with several battery cells 12, which are arranged next to one another in the stacking direction, i.e. the x-direction represented here, wherein a gas reservoir 20 is arranged between each two battery cells 12 arranged adjacent in the x-direction as represented in FIG. 3. Except for the design of the gas reservoir 20, this battery cell arrangement 10 can otherwise be designed as already described for FIG. 1 and FIG. 2. If the battery cells 12 swell in the x-direction over the course of their service life, the compressive force in the central region on the gas reservoir 20 between each two battery cells 12 increases in particular. The wall structure 42 described above can ensure that the interior space 24, in which the gas 22 is accommodated, is not compressed too much. The grooves or indentations provided by the wall structure 42 then function accordingly as support points in the x-direction. Furthermore, it is advantageous if the gas reservoir 20 also has spacers 27 in this case. These have a certain minimum thickness d in the x-direction, which in turn ensures a certain minimum distance between battery cells 12 arranged adjacent to one another. This can also prevent the gas reservoir 20 from collapsing. In the present example, these spacers 27 are simultaneously designed as clamps, in which the edge regions 28' of the reservoir walls 20a, 20b are accommodated, at least the edge regions 28' located in and opposite the y-direction. Optionally, these spacers 27 can be designed not only as a type of rails that extend in the z-direction, but optionally also as a completely surrounding frame. Due to the clamping effect, which can thus be provided by the geometry of the spacers 27, an additional seal in the edge region 28' of the reservoir 20 is achieved. Furthermore, the spacers 27 can also be designed with a hinge in order to facilitate attachment in the edge region 28'. For example, such a spacer 27 can have two legs 27a, 27b, which can be folded apart, for example via a hinge, so that the gas bag, which is provided by the two gas reservoir walls 20a, 20b with the gas 22 contained therein, can simply be inserted into such a spacer and this can then be closed by folding the legs 27*a*, 27*b*. By providing such a bending option or a hinge, it is also possible in the cell assembly, i.e. the battery cell arrangement 10, to transfer additional compressive forces that act from the battery cells 12 on these spacers 27 as contact forces on the edge region 28' of the reservoir walls 20*a*, 20*b*.

Furthermore, these gas reservoirs 20 also have at least one releasable opening 34. This can in turn be arranged in an edge region delimiting the gas reservoir 20 in or counter to the z-direction. In this case, however, there is also the possibility of integrating such a releasable opening 34, as represented in FIG. 4, into one of the walls 20*a*, 20*b*, so that the gas 22 can expand into a free cavity 44 between the battery cells 12 if such a releasable opening is opened, which in turn can also be fluidly connected to the environment 30. As a result, a cooling effect can then be provided between the battery cells 12 in a particularly efficient manner.

Figures 5, 6:
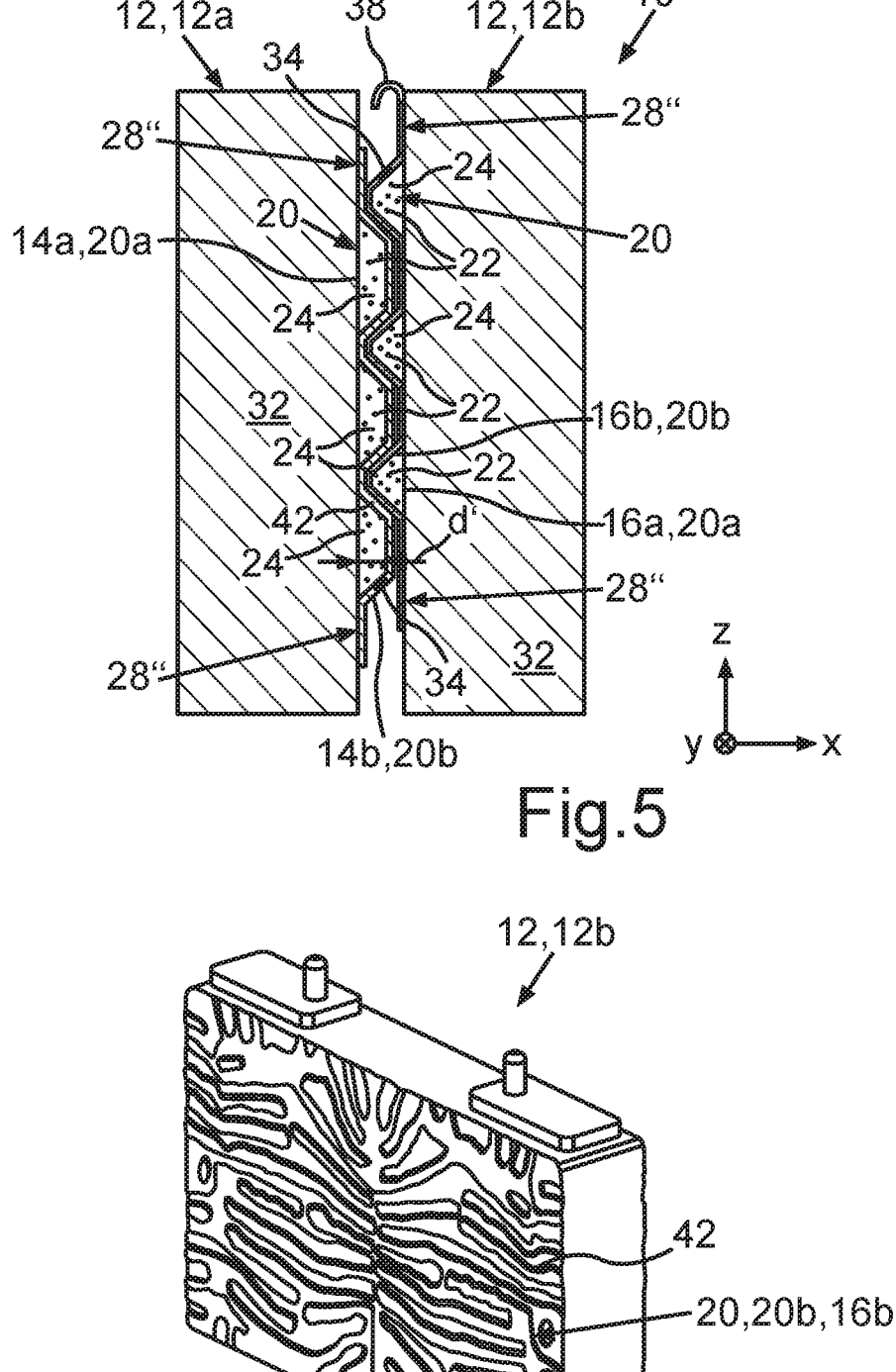
FIG. 5 shows a schematic representation of a battery cell arrangement with gas reservoirs integrated in the battery cells according to a further exemplary embodiment of the invention.
FIG. 6 shows a schematic representation of a battery cell with an integrated gas reservoir in a perspective representation according to an exemplary embodiment of the invention.

A further possibility for forming a gas reservoir 20 is to integrate it into a battery cell 12 itself, as is illustrated in FIG. 5 by way of example. For this, FIG. 5 again shows a schematic representation of a battery cell arrangement 10 according to a further exemplary embodiment of the invention. This also has, for example, a first battery cell 12*a* and a second battery cell 12*b*. The first battery cell 12*a* in turn has a cell interior 32 in which the cell chemistry is also arranged. This cell interior 32 is delimited by an inner wall 14*a* of the battery cell 12*a*. In the x-direction next to this inner wall 14*a*, the battery cell 12*a* has another outer wall 14*b*. In turn, an interior space 24 is provided between the inner wall 14*a* and the outer wall 14*b*, which is filled with gas 22, which in turn can be $CO_2$ or any other oxygen-free gas. The gas reservoir 20 is thus integrated into the first battery cell 12*a*, wherein the inner wall 14*a* correspondingly acts as the first reservoir wall 20*a* and the outer wall 14*b* of the battery cell 12*a* as the second reservoir wall 20*b*. The inner wall 14*a* and the outer wall 14*b* are in turn joined together circumferentially in an edge region 28", for example welded, and they thus close off the interior space 24 in a gas-tight manner.

Furthermore, in the present example, the outer wall 14*b* again has a wall structure 42. This wall structure 42 in turn allows the stability and structural rigidity of the gas reservoir 20 to be increased. This prevents the gas reservoir 20 from bursting immediately and allows the gas 22 to be discharged in a controlled manner in the event of a thermal runaway of a battery cell 12. The second battery cell 12*b* is also designed analogously with an integrated gas reservoir 20. In the case of the second battery cell 12*b*, the gas reservoir walls 20*a*, 20*b* therefore correspond to an inner wall 16*a* of this second battery cell 12*b* and to an outer wall 16*b* of this second battery cell 12*b*, analogously as described for the first battery cell 12*a*, only on the opposite side with respect to the x-direction. Furthermore, the outer wall 16*b* is also formed with a wall structure 42 in this case. This wall structure 42 is designed to be complementary to the wall structure 42 of the outer wall 14*b* of the first battery cell 12*a*. This makes it possible to arrange the two battery cells 12*a*, 12*b* compactly relative to one another, so that the structured outer walls 14*b*, 16*b* interlock. As a result, other configurations are also conceivable. For example, the respective outer wall 14*b*, 16*b* could also be flat and the respective inner sides 14*a*, 16*a* can be provided with a corresponding wall structure 42. It is also conceivable that a respective battery cell 12 only ever has such an integrated gas reservoir 20 on one side and therefore always on the same side with respect to the x-direction, that is to say the stacking direction. By lining up such battery cells 12 in a row in the x-direction, such a gas reservoir 20 is automatically arranged between each two cell interiors 32.

FIG. 6 again shows a schematic and perspective representation of such a battery cell 12 with an integrated gas reservoir 20, of which only the structured outer wall 16*b* which provides the reservoir wall 20*b* can be seen in this representation. The battery cell 12 corresponds in particular to the second battery cell 12*b* from FIG. 5.

In this example as well, the respective gas reservoirs 20 can in turn have a corresponding releasable outlet opening 34. Such is shown for the respective gas reservoir 20 of the first battery cell 12*a* and the second battery cell 12*b* in FIG. 5. In addition, the battery cells, such as the second battery cell 12*b* in this example, can again be designed with a deflection element 38 in order to direct the gas flow of the exiting gas 22 to the battery cells 12 in a suitable manner. This in turn increases the cooling effect.

Overall, the examples show how the invention or its embodiments can provide a $CO_2$ bag between battery cells. Here, the installation space between the battery cells is used, in which there is an insulating material in conventional batteries. The installation space between two battery cells is typically two to four millimeters and is now used to store a gas therein. Such a gas has a significantly better insulating effect than the insulating materials that have been commonly used up to now. In addition, the gas can be used to cool a battery cell in the event of thermal runaway. Because the gas can be extremely compressed over time and temperature can be applied so that the pressure can be used like in a $CO_2$ fire extinguisher to cool if the gas escapes.

The stored gas can therefore be actively changed in terms of pressure and temperature. The integration of such a gas store or gas reservoir in a cell arrangement can take on various forms. For example, the gas can be sealed off by means of the cell walls or the gas is sealed off via a cavity directly in the battery cell by cell structures and double walls. The gas can also be stored in a separate bag and placed between two battery cells. The bag or in general the gas reservoir walls can be made of aluminum, steel, ceramic or plastic. Furthermore, the bag or, in general, the gas reservoir has a pressure relief valve, which opens in the event of a burst and cools the battery cells with the escaping gas. Furthermore, the gas reservoir can have different structures in order to control the pressure and temperature parameters differently. If the structure, i.e. the bag, cavity or battery cell, is more rigid, the pressure and temperature will rise less. The gas pressure in particular increases over the product life cycle due to the swelling of the battery cells. The gas pressure can be increased by bracing when installing the battery cells into modules. Spacers can also optionally be present between the battery cells. Furthermore, the gas can be guided in a targeted manner, for example by means of deflection elements, in order to cool the battery cell or the module in a targeted manner. A targeted opening of the channel and a guidance of the gas can also be provided, which can also be realized by a gas guide element. It can be on each battery cell individually or there can also be a discharge or a gas deflection element for each module. In addition, the gas control of the bags can be coupled to each other so that they are opened one after the other as soon as a bag opens. Thus, the gas bags are opened one after the other, similar to fireworks.

The invention claimed is:

1. A battery cell arrangement for a motor vehicle, comprising:

at least one first battery cell with a first cell housing which comprises a first cell wall, and a second battery cell which is arranged adjacent to the first battery cell in a first direction and has a second cell housing with a second cell wall;

wherein the first cell wall and the second cell wall face each other;

wherein the battery cell arrangement has a gas reservoir which is filled with a gas, so that the gas is arranged between the first cell wall of the first battery cell and the second cell wall of the second battery cell;

wherein the gas reservoir is configured as a component separate from the first battery cell and the second battery cell, the gas reservoir having a first reservoir wall and a second reservoir wall which delimit an interior space of the gas reservoir on both sides with respect to the first direction, the first reservoir wall and the second reservoir wall being joined together in a peripheral edge region to delimit the interior space in a gas-tight manner;

wherein the gas reservoir has at least one releasable gas outlet opening in the peripheral edge region, and the gas reservoir is configured such that a thermal runaway of the first battery cell and/or the second battery cell causes a release of the releasable gas outlet opening and a discharge of the gas through the released gas outlet opening in order to cool the first battery cell and/or second battery cell, wherein the at least one releasable gas outlet opening is configured to open when a specific condition that a temperature and/or a pressure of the gas exceeds a predeterminable threshold value;

wherein a closure element is provided for closing the peripheral edge region; and wherein the gas reservoir has a gas guide element which is arranged in a region of the at least one releasable gas outlet opening and which is configured to deflect a flow direction of the gas flowing out of the gas outlet opening toward the first battery cell and/or the second battery cell.

2. The battery cell arrangement according to claim 1, wherein a state parameter comprises a gas pressure and/or a gas temperature assigned to the gas accommodated in the gas reservoir, wherein the battery cell arrangement is configured such that the state parameter can be changed and wherein a change in the state parameter is controllable.

3. The battery cell arrangement according to claim 1, wherein the first reservoir wall and/or the second reservoir wall is configured with a wall structure such that a thickness of the interior space varies at least in a second direction perpendicular to the first direction.

4. The battery cell arrangement according to claim 1, wherein a respective spacer is arranged as part of the gas reservoir along at least two opposite edges of the peripheral edge region with respect to a direction perpendicular to the first direction, which defines a specific minimum thickness of the gas reservoir in the first direction at the edges.

5. A cell separating element for arrangement between two battery cells of a cell stack, the cell separating element configured as a gas reservoir comprising a first reservoir wall and a second reservoir wall, wherein the first reservoir wall and the second reservoir wall, being joined together in a peripheral edge region, gas-tightly delimit an interior space of the gas reservoir on both sides with respect to a first direction, the gas being accommodated in the interior space;

wherein a respective spacer is arranged as part of the gas reservoir along at least two opposite edges of the peripheral edge region with respect to a direction perpendicular to the first direction, which defines a specific minimum thickness of the gas reservoir in the first direction at the edges;

wherein at least one releasable gas outlet opening is arranged in the peripheral edge region and is configured to open when a temperature and/or a pressure of the gas exceeds a predeterminable threshold value;

wherein a closure element is provided for closing the peripheral edge region; and wherein a gas guide element is arranged in a region of the gas outlet opening and is configured to deflect a flow direction of the gas toward at least one of the battery cells.

6. A battery cell for an energy store of a motor vehicle, comprising:

a cell housing comprising an inner wall and an outer wall, the inner wall adjoining an interior of the battery cell enclosed by the cell housing, and the outer wall adjoining an environment surrounding the battery cell, wherein the inner wall forms a first reservoir wall of a gas reservoir and the outer wall forms a second reservoir wall of the gas reservoir, wherein the outer wall is arranged in a first direction next to the inner wall, and together the inner wall and the outer wall enclose an interior space that is different from the interior of the battery cell and filled with a gas;

wherein the inner wall and the outer wall are joined together in a peripheral edge region, so that they delimit the interior space in a gas-tight manner that accommodates the gas;

wherein a respective spacer is arranged as part of the gas reservoir along at least two opposite edges of the peripheral edge region with respect to a direction perpendicular to the first direction, which defines a specific minimum thickness of the gas reservoir in the first direction at the edges;

wherein at least one releasable gas outlet opening is arranged in the peripheral edge region and is configured to open when a temperature and/or a pressure of the gas exceeds a predeterminable threshold value;

wherein a closure element is provided for closing the peripheral edge region; and wherein a gas guide element is arranged in a region of the gas outlet opening and is configured to deflect a flow direction of the gas toward the battery cell.

* * * * *